United States Patent [19]
Baldwin, Jr. et al.

[11] Patent Number: 5,452,449
[45] Date of Patent: Sep. 19, 1995

[54] INTERACTIVE MULTI-MODULE SOURCE CODE ANALYZER THAT MATCHES AND EXPANDS CALL AND ENTRY STATEMENT PARAMETERS

[75] Inventors: William H. Baldwin, Jr., Wolcott; Ladd M. Bethune, Newington; Paul L. Czasonis, Granby; Gregory J. Kinsler; Paula S. Montenieri, both of Glastonbury; John C. Moore, Bloomfield; William J. Nagle, Southington; Susan R. Paton, Coventry; Janet J. Petrowsky, Unionville; Henry F. Robinson, Burlington, all of Conn.

[73] Assignee: ITT Corporation, Secaucus, N.J.

[21] Appl. No.: 158,185

[22] Filed: Nov. 24, 1993

Related U.S. Application Data

[63] Continuation of Ser. No. 725,601, Jul. 3, 1991, abandoned.

[51] Int. Cl.6 .............................................. G06F 17/30
[52] U.S. Cl. ..................... 355/600; 395/500; 364/DIG. 1; 364/282.1; 364/264
[58] Field of Search ............... 395/600, 700, 500; 364/401

[56] References Cited

U.S. PATENT DOCUMENTS

| | | | |
|---|---|---|---|
| 4,374,408 | 2/1983 | Bowles et al. | 395/375 |
| 4,558,413 | 12/1985 | Schmidt et al. | 395/600 |
| 4,931,928 | 6/1990 | Greenfield | 395/600 |
| 4,943,932 | 7/1990 | Lark et al. | 395/76 |
| 5,038,316 | 8/1991 | Hempleman et al. | 395/275 |
| 5,075,847 | 12/1991 | Fromme | 395/700 |
| 5,097,533 | 3/1992 | Burger et al. | 395/500 |
| 5,133,063 | 7/1992 | Naito et al. | 395/500 |
| 5,204,897 | 4/1993 | Wyman | 380/4 |
| 5,313,616 | 5/1994 | Cline et al. | 395/500 |

OTHER PUBLICATIONS

Navigator/MF TM Brochure for Centura TM Software, (No Date).
Via/SmartEdit TM Brochures Printed 1990 by Via Soft, Inc (2), (No Date).
Via/Insight ® Brochure Printed 1987 by Via Soft, Inc.
DCDIII TM (Data Correlation and Documentation System) Information Sheets Printed by Marble Computer, Inc., 1988.
PM/SS (Programming Machine/Standard Solutions) Information Sheets Printed by Adpac Computing Languages Corp., 1988.
Adpac TM Brochure by Adpa Computing Languages Corp Copyright 1988.
Ricketts et al, "Data Reengineering for Application Systems", Software Maintenance, 1989 Conference, 16–19 Oct. 1989, pp. 174–179.
Hill, "A Rule-Based Software Engineering Tool for Code Analysis", Computers and Communications 1988 Int'l Phoenix Conference, 16–18, pp 291–295.

*Primary Examiner*—Thomas G. Black
*Assistant Examiner*—Wayne Amsbury
*Attorney, Agent, or Firm*—Ware, Fressola, Van Der Sluys & Adolphson

[57] ABSTRACT

An interactive multi-module program analysis system consists of a batch data base load system for creating databases based upon information derived from program modules interface to be analyzed. This information includes inter-module information which is used in an interactive on-line program analysis system which allows the programmer/analyst to conduct an in-depth, thorough investigation of the modules selected, including data analysis, process analysis and impact analysis. The on-line system includes aids for navigating within the system and for reporting desired results from the on-line analysis.

11 Claims, 3 Drawing Sheets

FIG. 1

PRIOR ART

INTERACTIVE MULTI-MODULE SOURCE CODE ANALYZER THAT MATCHES AND EXPANDS CALL AND ENTRY STATEMENT PARAMETERS

This is a continuation of application Ser. No. 07/725,601 filed on Jul. 3, 1991 now abandoned.

A microfiche appendix containing program listings and related material is incorporated herein, 30 fiche, 1890 pages.

TECHNICAL FIELD

The present invention relates to systems for analyzing computer high-level language program modules, including their inter-module relationships. It further relates to a system for creating databases used in such program analysis systems.

BACKGROUND OF THE INVENTION

Many of today's corporations have developed vast amounts of computer software for use in their businesses. This software has typically been developed over many years and usually is written in a high level computer language, such as COBOL.

Application programs written in COBOL or other high level languages generally comprise a plurality of modules which inter-relate through calls and the like. Although not required by most versions of COBOL, such modules are generally written in a structured fashion; that is, their structure and flow follow certain rules which maintain overall structural integrity, thereby facilitating reliability and maintainability of the overall application program.

Nevertheless, the relationship between distinct modules in the application program can become extremely convoluted and difficult to understand when modifications or enhancements are needed. Problems typically exist in the maintenance and enhancement of such large application programs (sometimes referred to as systems), especially if such tasks are to be performed in an error-free, timely manner, and at a minimum cost.

Some of the current problems in performing such maintenance and enhancement functions are:

1) lack of uniform methodology in the maintenance or enhancement function implementation;
2) individual programmer coding styles can lead to many different styles within one or more modules;
3) the time required to understand a module by one programmer usually has to be completely repeated by the next programmer with the sometimes undesired effect that certain modules can only be effectively maintained by one programmer;
4) modification of modules may be made without knowledge of its impact on other modules;
5) inability to apply structured programming techniques to actual maintenance and enhancement due to the inability to understand the full nature of inter-relationships within one or more modules;
6) the maintenance and enhancement of program modules originally written in a structured manner can become unstructured especially when it is difficult to understand inter-module relationships; and
7) haphazard commenting and documentation can frustrate module and inter-module understanding.

As a result of these problems in maintaining and enhancing application programs, many corporations use up to approximately eighty percent of their programmers in maintaining existing programs rather than developing new programs.

Research has also shown that approximately fifty percent of the total time spent on a program maintenance change or enhancement is spent analyzing the current application so as to understand as best as possible, the overall impact of the maintenance or enhancement change.

The present invention is specifically directed to a system and method that provides multi-module relationship information which increases the speed and accuracy of the analysis process required when making a maintenance change or enhancement.

Typical prior art program analysis systems are summarized below:

Navigator/MF TM

This product, published by Compuware of Farmington Hills, Mich., is an on-line program analysis product which analyzes one COBOL module at a time. Although it provides detailed analysis of a single module, it lacks the capability of performing multi-level relational analysis and impact analysis across a plurality of COBOL modules.

VIA/SMARTEdit TM

This product, published by Viasoft, Inc. of Phoenix, Ariz., is another program analysis tool for analyzing one COBOL module. This product also gives the programmer/analyst the ability to edit a COBOL module. This product lacks the capability of performing multi-level relational analysis and impact analysis across a plurality of COBOL modules.

VIA/INSIGHT TM

This product, also published by Viasoft, Inc., performs an in depth analysis of one COBOL module without the edit function of VIA/SMARTEdit TM. This product also lacks the functions of multi-level relational analysis and impact analysis across a plurality of COBOL modules.

DCDIII TM (Data Correlation and Documentation System)

This product, published by Marble Computer, Inc. of Martinsburg, W. Va., is able to run in a background environment so as to produce report files of information derived from COBOL modules. The product does have the ability to do limited multiple module data dement analysis, but is not an interactive on-line tool that can provide user driven analysis as set forth in the present invention. This product is primarily a tool to produce documentation concerning a COBOL program with the ability to produce some system-wide documentation.

PM/SS TM

This product, published by Adpac Computing Languages Corporation of San Francisco, Calif., is a tool to extract information from COBOL modules for purposes of documenting the system and creating and monitoring standards. It can also be used for loading data dictionaries with information about data elements and analyzing the impact of changes. This tool is substantially different from the present invention and is presented primarily for purposes of showing tools which are ostensibly designed to increase productivity for maintaining existing COBOL programs.

Thus what is seen is that the present invention provides a system which can be used by the computer programmer or programmer/analyst who is trying to determine how a modification or enhancement to a program should be incorporated within that program.

The present invention in its preferred embodiment provides information about COBOL modules in eight created databases and provides through those databases interactive program analysis by an associated interactive program analysis system. The present invention is primarily differentiated from the prior art by providing not only a database generation system that creates multiple databases based upon information including inter-module information, contained in multiple modules, but also by providing an interactive program analysis system that uses the information within these databases so as to provide intra and inter-module information which is relevant to the programmer in order to implement a desired modification or enhancement. This interactive analysis can be provided in three main areas; namely, data analysis, process analysis, and impact analysis.

In data analysis, the present invention includes the ability to provide detailed analysis about how a data element is referenced, how a data element is used to change the value of another data element, and how the data element has its value set by other data elements, constants or literals.

In process analysis, the present invention includes the ability to analyze the call and calling modules and their parameters, to allow user controlled analysis of control flow between processes or paragraphs within a specific module, and to analyze the internal documentation of a user specified module.

In impact analysis, the present invention includes the ability to determine all modules and data elements that may be affected by a maintenance change or enhancement by providing the ability to search for applicable strings or words within one or more modules.

SUMMARY OF THE INVENTION

The present invention is directed to an interactive multi-module program analysis system. The overall system includes both a database generation system to create databases concerning multiple program modules, and an on-line interactive system to interrogate and navigate through these databases. This latter aspect of the present invention results in an on-line analytical system designed to assist programmer/analysts through the processes necessary to determine the "hows", "whys", and "wheres" of a modification or enhancement to a computer program wherein the analysis is performed on one or more modules of the overall program.

The database generation system comprises a batch database load function which is run with respect to every program module that forms an overall application program (system). Such an overall application program might be an automobile insurance policy system for creating and maintaining insured policy information for an insurance company. The batch database load function extracts information from each module's source code and remarks so as to make the information available to the interactive program analysis portion of the present invention. In the preferred embodiment of the present invention, eight databases are created specifically directed to data element information, inter-module information, and source code and remarks information.

The interactive program analysis portion of the present invention performs an on-line function which features user-driven navigation for interactive analysis of the information and relationships produced from and contained within the eight databases created during the batch load portion of the present invention. Through a series of menus, selection screens and user driven on-line reports, the programmer/analyst can easily perform analysis tasks more accurately and in a shorter period of time than that previously attainable with prior art program analysis tools.

In particular, the interactive program analysis portion of the present invention has four primary portions, the global module selection portion, the data analysis portion, the process analysis portion, and the impact analysis portion. The global module selection portion allows the programmer/analyst to customize the scope of the session by specifying the particular modules to be analyzed so as to fit the analysis needs of the current maintenance or enhancement activity. Many times the particular modules required for analysis are known in advance for a particular maintenance activity and thus selection of those modules, to the exclusions of others which may form part of the overall application program, is desirable in order to streamline the analysis process.

The global module selection portion of the present invention includes the ability to use masking characters and ranges to select modules from an entire program application; the ability to create and re-use individual lists of modules; the ability to create, re-use and secure divisional modules lists; and the ability to change the scope of the current program analysis session as the analysis needs change.

Detailed analysis of data elements includes how the data element is referenced, how the data element is used to change the value of other data elements and how the data element has its value set by other data elements, constants or literals. In particular, the data analysis portion of the interactive program analysis system allows the programmer/analyst to perform detailed analysis of the data elements referenced within the procedure-division source code of a specified module or a specified pair of modules linked by corresponding call and entry statements. In data analysis, the present invention can:

1) determine all modules that a call-parameter is passed to from a given module and what the matching entry-parameters are named;
2) trace a report data element to its origin and see everything that happened to create the report data element;
3) determine all data elements that can change the value of a specific data element;
4) determine all the places that a specific data element changes the value of other data elements; and
5) determine all the modules that use a specific data element through linkage.

When selected, process analysis allows the programmer/analyst to perform higher level analysis for the selected modules or a subset thereof. Process analysis includes analysis of the call and calling modules and their parameters; analysis of the control flow between processes (paragraphs within a specific module); and analysis of the internal documentation of a user specified module. In particular, process analysis can:

1) determine the call and calling hierarchy of the selected modules and view the documentation for any particular module within this hierarchy;
2) create a tree diagram of the call and calling modules beginning with any user specified module or for all selected modules in the current interactive session;

3) determine the entire calling structure of a group of modules beginning with any specified module;
4) match the call and entry-parameters between any calling module and called module, and in particular to expand the subelements of any parameter;
5) determine for any subelement of any parameter, how that subelement is referenced, used, set, called or how it calls other subelements;
6) determine if there is a mismatch between the call-parameters of a calling module and the entry-parameters of a called module;
7) determine if a modification to one module will affect other modules, and in particular, determine if the data being changed in one module is used in a call from another module or in a call to another module;
8) trace a call-parameter in a user specified module to all other modules in that chain regardless of parameter name differences. This analysis is particularly important for COBOL program modules where a parameter passed between the calling and called modules need not be known by the same;
9) trace the control flow within a module and navigate to called modules using the program being solved as the guide to the called modules;
10) determine what one or more modules do in their program execution by viewing their internal documentation;
11) determine when or if a change was put into a previous version of the module by viewing the remark section of the module through module documentation or by searching the remarks section for specific key words or strings of data using key word searching; and
12) determine what modules call specific utilities and conversely determine what utilities are called by what modules.

The impact analysis portion allows the programmer/analyst to determine all the modules and data elements that may be impacted by a maintenance change or enhancement. Impact analysis can:

1) determine where, within selected modules, a keyword string or strings is located, as well as to be able to immediately select those keywords for further analysis;
2) search source code database information, including remarks, comments and procedural source code for keywords or keyword strings that might help with the analysis of a particular problem;
3) determine all modules that are impacted by a change to a copy library member; and
4) determine such analysis as which modules in a system issue a specific user abnormal end (abend) code by using keyword search capability.

It is to the ability to perform such data analysis, process analysis, and impact analysis that the present program analysis invention is particularly directed. In order to achieve these functions, the present invention creates a plurality of databases which are based upon the modules that form an application program or system. Thus the present invention is also directed to the generation of databases for use in program analysis, including the generation of a source code database, a how-referenced database, a how-used database, a how-set database, a copy-member database, a call-parameter database, an entry-parameter database, and a parameter-expansion database.

The present invention thereby provides a multi-module program analysis system which can perform multi-level relationship analysis of all or some of the modules selected by the programmer/analyst; can provide impact analysis concerning relationships between the selected modules and their data elements through use of physical address location rather than the name of the data dement, thereby providing the capability of tracing a data element's activity through the selected modules in order to determine the complete impact of a maintenance change or enhancement; provides an analysis system which is module source code dependent with no external dependencies, thereby preventing inclusion of inaccurate or not up-to-date information; requires no user input concerning module information other than their names; and provides user driven analysis and reporting capability.

OBJECTS OF THE INVENTION

It is therefore a principal object of the present invention to provide an interactive multi-module program analysis system for analyzing multiple program modules, and in particular, to be able to provide data analysis, process analysis, and impact analysis concerning those modules so as to facilitate their modification or enhancement.

Another object of the present invention is to provide such a system with data analysis capability including how data elements are referenced, how data elements are used to change the value of other data elements, as well as how data elements have their values set by other data elements, constants or literals.

A still further object of the present invention is to provide an interactive multi-module program analysis system in which process analysis includes analysis of the call and calling modules and their parameters, allows for controlled analysis of the control flow between processes within a specific module, and allows analysis of the internal documentation of a user specified module.

A further object of the present invention is to provide an interactive multi-module program analysis system in which the impact of a maintenance change or enhancement can be determined for the modules under analysis.

Another object of the present invention is to provide an interactive multi-module program analysis system which allows the programmer/analyst to customize the scope of the session, including the specific modules for which analysis is desired, so as to fit the analysis to the particular maintenance or enhancement activity, including the ability to use masking characters and ranges to select modules from an entire application program, the ability to create and re-use individual lists of modules, the ability to create, re-use and secure divisional module lists, and the ability to change the scope of a particular program analysis session.

A still further object of the present invention is to provide a system to create the databases for use in the interactive multi-module program analysis portion of the present invention, including the analysis of the source code of the modules selected in order to create databases.

Another object of the present invention is to provide such a database creation system in which specific databases are created/updated from module source code, including remarks and comments, the procedure-division source code and line numbers for every module selected; these databases for COBOL modules include a database containing the procedure-division source code and line numbers of the selected modules, a database containing information about all data elements that are referenced within the procedure-division source code of the COBOL modules, a database containing information about all data elements that are used within the procedure-division source code, a database containing information about all the data elements that have their values set or changed within the procedure-division source code, a database containing information about the copy library members used by each of the selected COBOL modules, a database containing information about the call-parameters of each selected module, an entry-parameter database containing information about the parameters used in the entry statements of selected modules called by other modules, and a parameter-expansion database containing information about the parameters passed between called and calling modules so as to correlate the call and entry-parameters and expand the parameters to display information about the subelements of those parameters.

Other objects of the present invention will in part be obvious and will in part appear hereinafter.

BRIEF DESCRIPTION OF THE DRAWINGS

For a fuller understanding of the nature and objects of the present invention, reference should be made to the following detailed description taken in connection with the accompanying drawings in which.

BEST MODE FOR CARRYING OUT THE INVENTION

Figure 1:
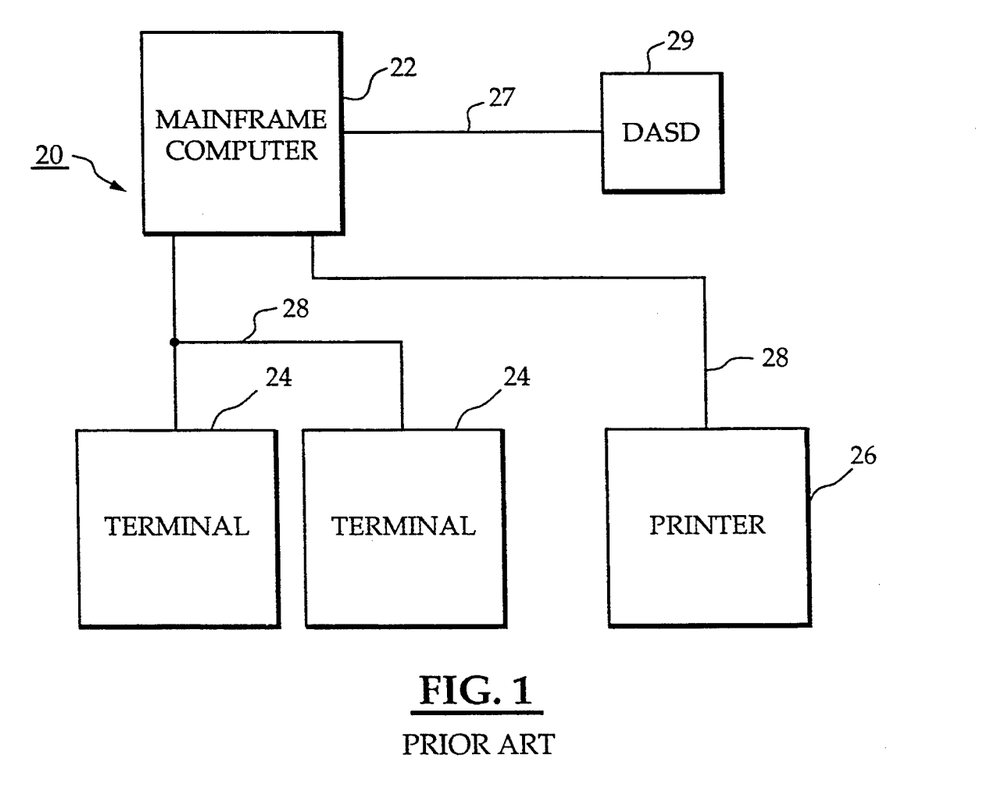
FIG. 1 is a detailed block diagram of the computer hardware used to implement the interactive multi-module program analysis system of the present invention.

As best seen in FIG. 1, the overall interactive multi-module program analysis system 20, including a database generation system for multi-module program analysis, is typically implemented on a mainframe computer 22 interconnected by serial link 28 to one or more terminals 24 and one or more printers 26 and also connected by bus 27 to direct access storage device (DASD) 29 for the storage of program modules, databases and other information. The mainframe computer in the preferred embodiment is an IBM type 3090 mainframe or equivalent and the terminals are IBM 3270 or equivalent. Any type of mainframe compatible printer, such as an IBM 3800 laser printer can be used.

The present invention was specifically implemented for analyzing OSVS COBOL source code modules.

Database Creation System

In order for the on-line interactive portion of the present invention to operate, certain information concerning the program modules to be analyzed must be created in a plurality of databases. Thus, the present invention includes a database generation system which is executed on every program module that can be later selected by the user for purposes of interactive analysis. Typically, the database generation system is run against every program module within a particular company application area. Thus, for example, in an insurance company, the personal lines insurance related modules might form the basis of an application program or system. Or course, the number of modules used in a particular application program can vary from a few to several thousands or more. In the preferred embodiment of the present invention, the database creation system is executed on type OSVS COBOL modules so as to create eight distinct databases. These databases are later used during interactive program analysis. Although the present invention was implemented for use with COBOL modules, it could also be implemented for use with other high level languages which use inter-related modules to define an overall program used to instruct the execution of a desired operation.

Figure 2:
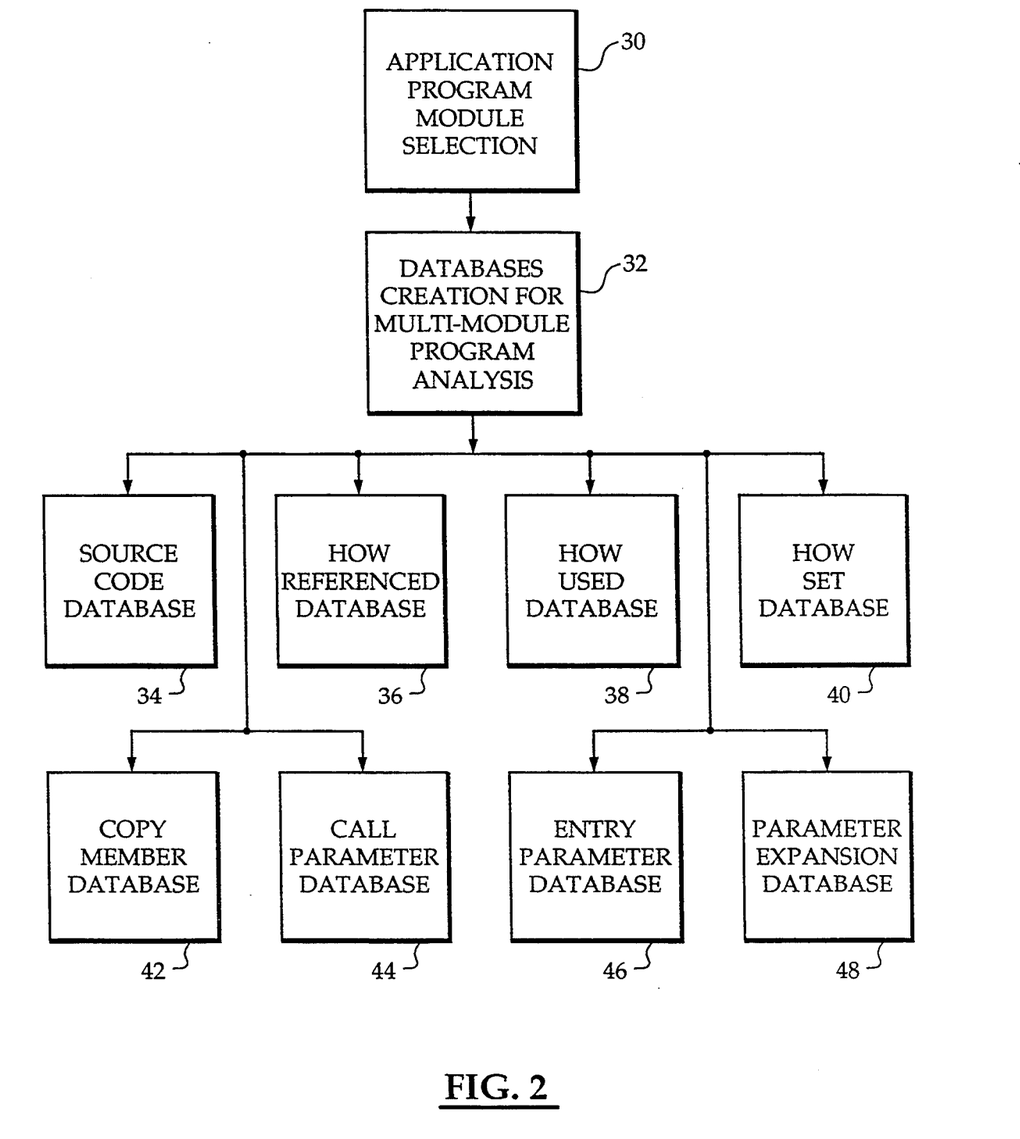
FIG. 2 is a flow chart of the database creation system of the present invention.

As best seen in FIG. 2, the first step in creating the databases is to select every module which may require interactive program analysis, step 30. Typically this step groups all modules which pertain to a given application program, as discussed above. No modification to the modules is necessary if the modules are functional (can be compiled).

Step 30 represents the selection of all modules which combine to form an application program. In order to create the databases, the amount of storage required is generally estimated with regard to the direct access storage device (DASD) 29. The DASD stores the eight databases. The amount of space is proportional to the number of modules forming the overall application program system.

In the particular implementation described herein, the location of the COBOL modules is either in a production Panvalet Library or a test Panvalet Library. This information is used along with the version number of each COBOL module.

Following that step, the database generation system creates eight databases through analysis performed at step 32, the eight databases being the source code database 34, the how-referenced database 36, the how-used database 38, the how-set database 40, the copy-member database 42, the call-parameter database 44, the entry-parameter database 46, and the parameter-expansion database 48.

An MVS/TSO operating environment primary command list (CLIST) called PROBOL is executed which provides the operating basis for executing other command lists, including the LOADJCL command list used to create the eight databases. The PROBOL command list and its related command lists to select the modules to be loaded into the batch load process form step 30.

In the preferred embodiment of the present invention, all the command lists used, including those to select modules to execute creation of the databases, and to update the databases are contained in a library identified as @AMWP02.PRB1.CLIST. This partitioned data set comprises seventy-one members, including the PROBOL and LOADJCL command lists. All members of this partitioned data set are included in the microfiche appendix.

As explained above, the LOADJCL CLIST is then used to create the eight databases at step 32. Detailed explanation of the LOADJCL operation is presented in Table 1 below. Each selected COBOL module is run through this batch load process to extract and load the needed to create the eight information databases. A description of this batch load process is presented in the next section.

If there is a problem with the batch load process such as a compiler error greater than a warning level or an incorrect module version number, the process is aborted with correction before reprocessing.

After all COBOL modules have been loaded through the batch load process, the eight databases are sent from the MVS TSO operating environment to the VM CMS operating environment, which is the environment for the interactive program analysis portion of the present invention. After the databases are created, access codes are generally created that provide access to the user for the interactive on-line portion of the present invention.

Later if a COBOL module in an overall program system is changed during the course of maintenance or enhancement, the updated information is reloaded into the eight databases through the batch load process. Typically such updates can be performed on a monthly, weekly or other periodic time basis depending upon the needs of the application area from which the modules were obtained.

This update process begins by creating an audit trail database of the COBOL module names, their version and the date their extract was added to the information databases. The audit trail database is updated after every update of the databases.

An automatic update process uses the updated audit trail database to compare the names and versions of the COBOL modules that have information on the databases to the names and versions of the COBOL modules on the production Panvalet library. If the version is different, it signifies a new production release of that module has occurred and that the databases need to be updated with the new concerning that module. A list of all modules to be updated, along with any new modules added to the system is then created.

The batch load process for new modules and each module that needs its information updated in the database is then run creating eight databases loaded with updated and new module information located in the MVS TSO operating environment. The eight update databases are used as the transaction files to update the databases for the overall interactive system.

Batch Database Load Function for Creation of the Eight Databases

The batch load database function as described above is run for every COBOL module that will have its information accessible by the interactive multi-module program analysis system. The batch load function extracts information from the COBOL source code and inserts the information into the eight databases which are then referenced by the interactive program analysis portion of the invention. The load process uses program code as set forth in the micro-fiche appendix, as well as specific third party proprietary utility programs which are available for license; specifically, IBM programs identified as IKJEFT01, IEFBR14, IEBUPDTE, and DISK-SORT, and Marble Computer, Inc. (Martinsburg, W. Va.) program called Cobol Structuring Aid (CSA).

The batch database load function as set forth in the microfiche appendix LOADJCL is a batch job consisting of fifty-five steps. A description of these fifty-five steps is presented in Table 1.

TABLE 1

The load function is a batch job consisting of 55 job steps. A description of the 55 steps follows:

1. Execute IBM Utility program IKJEFT01 to delete existing data sets that may be left over from a previous attempt to load this Cobol module.
2. Execute IBM Utility program IEFBR14 to allocate a data set to be used in the event of a job step having an abnormal ending. This data set is referred to as a dump data set.
3. Execute IBM Utility IEBCOPY to copy blank record to the data set created in the previous step, for use if a job step has an abnormal ending. This is done so the dump data set can be checked later for data.
4. Execute IBM Utility program IEBCOPY to copy the Cobol module name, version and origin information to a temporary file for later use.
5. Execute ITT Hartford written program WP9019PC to determine if prior loads caused one or more data bases to run out of space—if so the load process will stop at this point with an abnormal termination.
6. Execute IBM Utility program IEFBR14 to allocate all of the files needed by this batch load job.
7. Execute the ITT Hartford procedure COBLDIAG to retrieve the Cobol module being loaded from the Panvalet library where it is stored and do a diagnostic compile of the module. If the module is not found on Panvalet or the module has compile errors greater than warning level the load job will end with an abnormal termination.
8. Execute ITT Hartford program WP9015PC to cause an abnormal termination of the batch load function if the Cobol module had diagnostic errors greater than Warning Level.
9. Execute IBM Utility IEBCOPY to copy the Cobol source code to a partitioned dataset as required by LIBXREF.
10. Execute ITT Hartford program DTPANRPC to bundle the Cobol source code and its copylib members into one dataset.
11. Execute ITT Hartford program WP0603PC to flag all 'EJECT' and 'SKIP' records found in the dataset created in step 10, which includes the Cobol module source code and all copy library members referenced by the source code, so that these statements remain intact after the expansion of the Cobol Source code and subsequent creation of a new Cobol source module that includes all copy-member data fields as part of the actual source code.
12. Execute the IBM utility IEBUPDTE to unbundle the dataset created in step 10. This will become a temporary data set containing all of the copy library members and a dataset containing the Cobol source code with the 'EJECT' and 'SKIP' statements flagged.
13. Execute the ITT Hartford program WP0600PC to remove the word 'SUPPRESS' from any copy statements. This is done to assure that all copy-members are fully expanded into the code when it is compiled.
14. Execute the ITT Hartford procedure WPCOBLJA to execute a diagnostic compile of the output from step 13. This is done to expand all copy-members into the source code and to make sure the previous step did not do anything to cause the module to have compile errors. The output of the diagnostic compile is written to a data set to be used in the step 16.
15. Execute ITT Hartford program WP9016PC to cause an abnormal termination of the load job if there were compile errors greater than warning level.

16. Execute ITT Hartford program WP0605PC to create a new Cobol source module (with all copy-members included) from the compiled output dataset created in step 14. This consists of taking the 121 byte records that were output from the compile in step 14 and making them into appropriate 80 byte Cobol source code records, making comments out of any copy statements that can cause this new file to be uncompilable and renumbering the Cobol source code.

17. Execute the ITT Hartford procedure WPCOBLIA to execute a diagnostic compile of the output from step 16. This is done to ensure that the new module created in step 16 created a compilable Cobol module.

18. Execute ITT Hartford program WP9017PC to cause an abnormal termination of the load job and write out the appropriate abend message if there were compile errors greater than warning level.

19. Execute ITT Hartford program WP1400PC to find any 'NOTE' statements in the Cobol source data set that was the output from step 17. Any 'Note' statements found are made into blank lines. This is done because the VS Cobol statement 'NOTE' is a 68 Cobol statement and is not recognized by 'FASTBOL' a Cobol parser that is used later in the load process.

20. Execute ITT Hartford procedure WPCOBLJA to execute a diagnostic compile of the output from step 19. This is done to ensure that the removal of 'NOTE' statements in the previous step did not cause the Cobol source code to be uncompilable.

21. Execute ITT Hartford program WP9024PC to cause an abnormal termination of the load job and write out the appropriate abend message if there were compile errors greater than warning level as a result of step 20.

22. Execute IBM Utility IEBCOPY to copy the Cobol source module that was the output from step 19 to a partitioned data set for later use by LIBXREF.

23. Execute the ITT Hartford procedure LIBXREF to extract all data name references from the procedure-division of the Cobol Source code stored in the partitioned data set from step 22. This information will be used to load the How-Referenced PROBOL database.

24. Execute the IBM utility DISKSORT to sort the referenced data names information file from step 23.

25. Execute the ITT Hartford procedure LIBXREF to create a file of all copy library members used in this Cobol module. The dataset copied to a partitioned dataset in step 4 is the input to this step. This copy library member information is used to load the Copy-Member PROBOL database.

26. Execute ITT Hartford program WP9018PC to determine if the output from the previous step found at least one copy library member was used in the Cobol source code. This is to know whether or not to load the copy library member information into the Copy-Member PROBOL database.

27. Execute the ITT Hartford procedure WPFBFLJA to execute the FASTDOC portion of FASTBOL to extract how all datanames are used to change the values of other data elements and how all datanames have their values set by other datanames or constants in the procedure-division of the Cobol source module created in step 16. Two files are created, one of How-Set information and one of How-Used information. These files are used to load the How-Used PROBOL database and the How-Set PROBOL database.

28. Execute the ITT Hartford procedure FOCUS to execute the ITT Hartford Focexec WPPU08FE to abend if there were any errors produced from executing FASTDOC in step 27.

29. Execute the ITT Hartford procedure WPCSADJA to execute Cobol Structuring Aid (CSA) from Marble Computer Inc. This is done to ensure consistent formatting of all call and entry statements in the Cobol source code to enable the parsing of the call and entry statements in subsequent job steps.

30. Execute ITT Hartford program WP0002PC to find the call and entry statements within the Cobol source code and extract the corresponding call and entry-parameters to call and entry files. If there is a problem with this process the batch load job is terminated.

31. Execute the ITT Hartford program WP0077PC to create a file of the Cobol module being called from within the Cobol module being loaded and the source line number of the call.

32. Execute the ITT Hartford program WP0003PC to retrieve all the parameters that are associated with the 'Call Using' statements and all the levels of data elements that are sub parameters of the parameters from the data division of the module being loading to PROBOL.

33. Execute the ITT Hartford program WP0006PC to retrieve all the parameters that are associated with the 'Entry using' statements and all the levels of data elements that are sub parameters of the parameters from the data division of the module being loading to PROBOL.

34. Execute the ITT Hartford program WP0008PC to determine the physical size and attributes of all of the data elements included in the Call statements of the Cobol module being loaded.

35. Execute the ITT Hartford program WP0097PC to combine the records on the file created in step 32 with the records on the file crated in step 34. This produces a file of records containing all levels of data elements included in the Call Using statements of the Cobol module and their corresponding physical size and attributes.

36. Execute the IBM Utility IEBCOPY to concatenate the output file from step 31 to the end of the file created in step 35. This will create a file of all the modules called from the Cobol module being loaded into PROBOL and the source code line of the calls and all levels of data elements and their physical size and attributes that are passed in calls to other modules.

37. Execute the ITT Hartford program WP0009PC to determine the physical size and attributes of all of the data elements included in the Entry statements of the Cobol module being loaded.

38. Execute the ITT Hartford program WP0098PC to combine the records on the file created in step 33 with the records on the file created in step 37. This produces a file of records containing all levels of data elements included in the 'Entry Using' statements of the Cobol module and their corresponding physical size and attributes.
39. Execute the ITT Hartford program WP9012PC to determine if the Cobol module being loaded contained any Call-parameters. This is done by checking for at least one call-parameter on the file created in step 36.
40. Execute the ITT Hartford program WP9014PC to determine if the Cobol module being loaded contained any Entry-parameters. This is done by checking for at least one Entry-parameter on the file created in step 38.
41. Execute the ITT Hartford procedure FOCUS to execute the focexec WPL519FE to add the following fields to the call-parameter file that was created in step 38; Call-Parameter data element number, sign indicator field, the type of field indicator and reassign the left decimal size indicator to zeroes if the type of field indicator is 'c'. This step is only run if the module being loaded was found to have call-parameters.
42. Execute the ITT Hartford program WP9025PC to determine if there were any call-parameters on the output file from step 41.
43. Execute the IBM utility DISKSORT to sort the call-parameter file created in step 41. The file is sorted by the Cobol module name, the call order of the call, the called module name, the called parameter order and the call parameter data element number.
44. Execute the ITT Hartford procedure FOCUS to execute the focexec WPL509FE to add the following fields to the file of entry-parameters that was created in step 38: Entry-Parameter number, sign indicator field, type of field indicator and reassigns the left decimal size field to zeroes if the character type is 'c'.
45. Execute the IBM utility DISKSORT to sort the output file from step 44. The sort order is Cobol module name, Entry-parameter order number and Entry-parameter data element number.
46. Execute the ITT Hartford procedure FOCUS to execute the WPL600FL focexec to load the copy-member file created in step 25 into the previously allocated PROBOL copy library member database, WPCOPYFD.
47. Execute the ITT Hartford procedure FOCUS to execute the focexec WPL520FL to load the PROBOL call database WPCALLFD with the call file from step 43, and execute the focexec WPL521FL to load call data from the file from step 43 to the PROBOL parameter database WPPARMFD.
48. Execute the ITT Hartford procedure FOCUS to execute the focexec WPL510FL to load the PROBOL entry database WPENTRFD with the entry file from step 45, and execute the focexec WPL511FL to load entry data from the file from step 45 to the PROBOL parameter database WPPARMFD.
49. Execute the ITT Hartford procedure FOCUS to execute the focexecs WPL522FE and WPL523FL to update the has occurs and has sync indicators on the PROBOL parameter database WPPARMFD.
50. Execute the ITT Hartford procedure FOCUS to execute the focexecs WPL110FL, WPL205FL, WPL210FL, WPL305FE, WPL310FL, WPLS10FX and WPLS25FL to load the PROBOL How-Referenced database WPHREFFD, the PROBOL Source Code database WPSRCEFD, the PROBOL How-Set database WPHSETFD and the PROBOL How-Used database WPHUSEFD. The files used to load the databases are the output files from steps 23, 16, 27, and 27 respectively.
51. Execute the ITT Hartford procedure FOCUS to execute the focexec WPPU09FE to abend if any of the eight PROBOL databases ran out of space during the load process.
52. Execute the ITT Hartford procedure FOCUS to execute the focexec WPPU06FE to determine the completion code of the job if any of the preceding job steps had an abnormal termination.
53. Execute the ITT Hartford program WP9022PC to write the module name, step name and completion code to an output file if any of the preceding job steps had an abnormal termination. This output file will be used later to resolve the abnormal termination.
54. Execute the ITT Hartford program WP9023PC to write the module name, version and 'comp code=0' to the same output file created in step 53, if the batch load job has not had an abnormal termination in any of the preceding job steps.
55. Execute the IBM utility IKJEFT01 to delete all the workfile datasets created during the batch load job.

The master file database descriptions for the eight created databases as defined in Focus release 6.0 language (FOCUS, release 6.0 from Information Builders, Inc., 1250 Broadway, New York, N.Y. 10001-3782) are presented and in the microfiche appendix. A general description of each database is presented in Table 3.

TABLE 3

1. SOURCE CODE DATABASE—this database contains the Remarks section (including comments) and the Procedure-Division Source Code (including comments) and their line numbers for every COBOL module that is loaded into the database creation system. The Source Code database is derived from the expanded source code.
2. HOW-REFERENCED DATABASE—this database contains information about all the data elements that are referenced within the procedure-division source code for every Cobol module that is loaded into the database creation system. The information includes the data element name, the module name, the line number where the reference is located, and an update indicator that is set to 'U' if the reference changes the value of the data element.

The How-Referenced database is derived from the LIBXREF data element cross reference run (see Table 1).

3. HOW-USED DATABASE—this database contains information about all the data elements that are used within the Procedure-Division source code of the Cobol modules to change the value of other variables in the module. The information includes the data element name, the module name, the line number of the statement where the data element is used to change another variable and the name of the How-Used variable being changed.

The How-Used database is derived from the FAST-DOC How-Used report (see Table 1).

4. HOW-SET DATABASE—this database contains information about all the data elements that have their values set or changed within the Procedure-Division source code of the Cobol modules. The information includes the data element name, the module name, the line number of the statement where the data element is set or changed and the name of the How-Set variable that changes the data element's value, whether it is a constant, a literal or another data element.

The How-Set database is derived from the FAST-DOC How-Set report (see Table 1).

5. COPY-MEMBER DATABASE—this database contains information about the copy library members (members of a copy library that can be referenced by name) used by each of the Cobol modules loaded into the database creation system. The information includes the module name and each copy library member used by the module.

The Copy-Member database is derived from the LIBXREF copy cross reference run (see Table 1).

6. CALL-PARAMETER DATABASE—this database contains information about the call-parameters for each called module for each Cobol module loaded into the database creation system. The information includes the Cobol module name, the called module name, the call order (the physical order of the call in the source code), the call-parameters used in the call and the order of the parameters. The parameters are derived from the USING clause of the call statement. Static calls are handled. Calls to utilities are included in the database. UNKNOWN calls are those that the called module cannot resolve, such as calls to modules that are logically determined at execution time.

The Call-Parameter database is derived from linkage processing.

7. ENTRY PARAMETER DATABASE—this database contains information about the parameters used in the entry statements of modules called by other Cobol modules loaded into the database creation system. The information includes the module name, the entry-parameter name and the entry-parameter order number. The entry parameters are derived from the using clause of the ENTRY statement. If there is no ENTRY statement and there is a PROCEDURE-DIVISION USING, the parameters will be derived from the PROCEDURE-DIVISION USING statement. The entry-parameter order number is derived from the position of the parameter in the parameter list. The Entry-Parameter database is derived from linkage processing.

8. PARAMETER-EXPANSION DATABASE—this database contains information about the parameters passed between called and calling modules to allow the interactive multi-module system to match up the call and entry-parameters and expand the parameters to display information about the sub-elements of the parameters. The information on the database includes the module name that the parameter is found in and the name of the call or entry-parameter. For each parameter and each sub-element of a parameter, information is stored on the database to allow the system to determine the actual size and description of each element. This information includes the level number of the element, an indicator as to whether the element is a parameter or a sub-element of a parameter, a beginning element location and an ending element location in relation to the length of the entire parameter, a type of data element indicator (char, numeric, edit, etc.), a field to indicate if the data element uses 'SYNC' and a field to indicate if the data element contains the 'OCCURS' clause. There are also fields to store the size of numeric data elements to the left and right of the decimal and a field to indicate if the element has a sign indicator. If an element redefines another element the redefined element is stored on the database. Three levels of 'occurs' size information can be stored for a data element and its sub-elements to be used in calculating the actual size of the element.

The Parameter Expansion database is derived from linkage processing.

It is seen from Table 3 that these databases contain multi-module information which provides the information necessary to perform the interactive multi-module program analysis system. Because the creation of these databases is dependent solely upon the source code and other information contained within the modules, there are no external dependencies and therefore no chance of incorporating inaccurate or out-of-date information; provided that, the latest versions of the modules have been loaded into the databases. It is also seen that the user does not have to provide specific information into the system in order for the modules to be analyzed. All data element, paragraph and inter-module relationships are established by the databases based upon the modules themselves.

It is thus the databases created with the database generation system as described above that the interactive program analysis portion of the overall analysis system is executed against.

Interactive Program Analysis System, Summary

Figure 3:
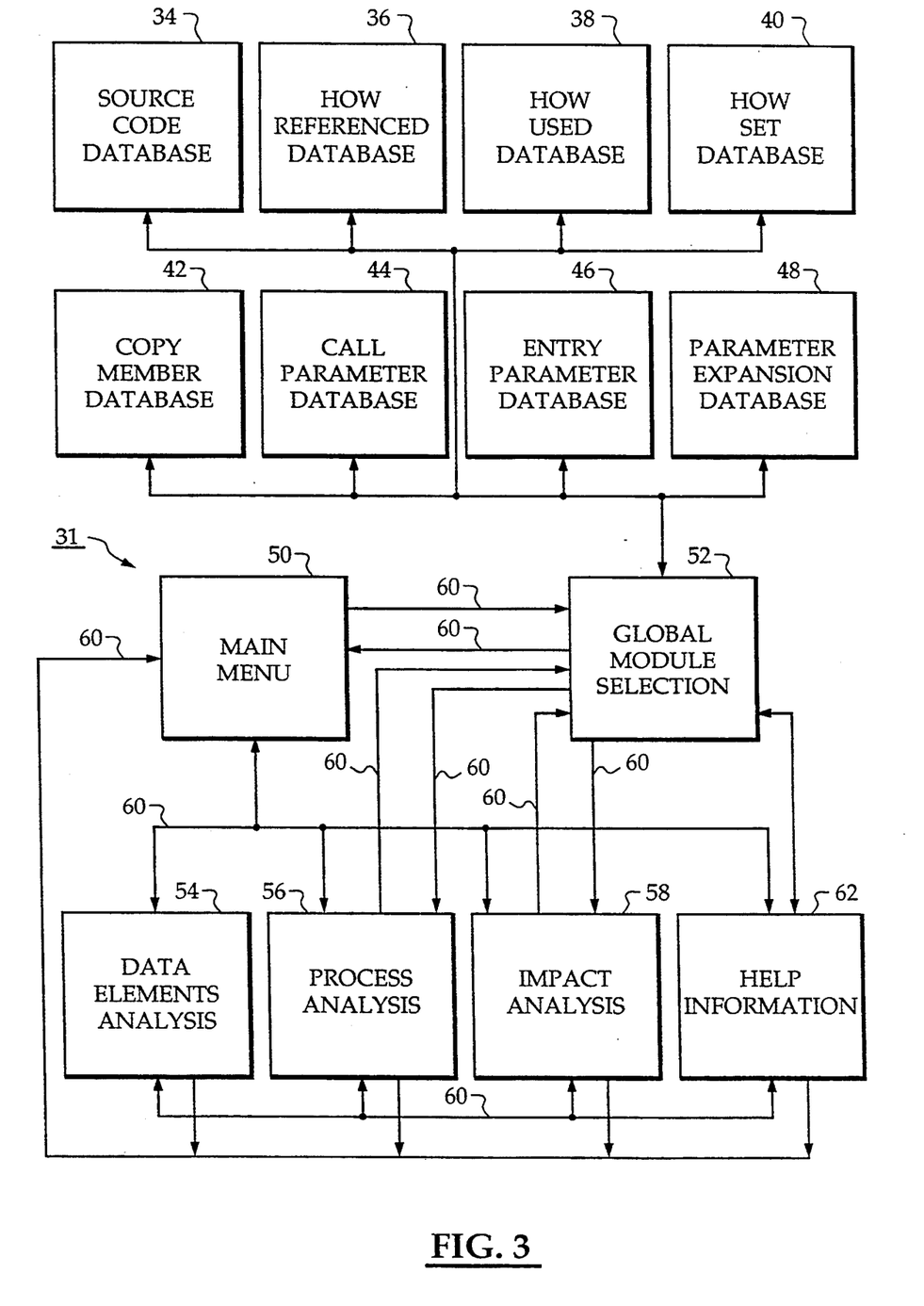
FIG. 3 is a flow chart of the on-line interactive multi-module program analysis system of the present invention.

As seen in FIG. 3, the interactive program analysis system 31 of the present invention is an on-line system written in FOCUS and release 6.0. The FOCUS focexecs listings are provided in the microfiche appendix. The focus master file descriptions for the interactive system are included in the microfiche appendix. This interactive system features user-driven navigation for interactive on-line analysis of the information in the eight databases created during the batch load function. Through a series of menus, selection screens and user driven on-line reports, a programmer/analyst can easily perform analysis tasks much more rapidly and accurately than in prior art system. The overall result is that the analysis and understanding of existing software applications which is necessary in order to sustain those applications over the course of their maintenance life cycle is greatly enhanced; thereby enhancing the effectiveness of the programmer/analyst for both maintenance purposes as well as for enhancing existing program modules. As seen in FIG. 3, system 31 presents a main menu 50 from which the four main sections of the system can be accessed; namely, global module selection section 52, data element analysis section 54, process analysis section 56 and impact analysis section 58. In order to perform the latter three analysis sections, the global module selection section must first be chosen in order to select the modules for analysis in the current session. The global module selection section then obtains the required information from the databases so as to be made available to the remaining portions of the system 31.

As seen by flow lines 60, the global module selection section can be re-accessed from most menus if the scope of the current session changes as determined by the programmer/analyst.

Help information section 62 is available from all the other sections. This section provides useful information concerning all operations of the interactive system, including report generation.

It is also clear from FIG. 3 that the interactive program analysis system provides for easy navigation from one analysis section to another and from one module to another within the current session. The overall result is an efficient and useful system for providing the necessary information needed to implement a desired maintenance or enhancement change to the selected modules.

Operation of the Interactive Multi-Module Program Analysis System

In order to access the interactive multi-module program analysis system, the programmer/analyst first must log onto the system. For the actual implementation, this requires access to the VM CMS environment via a CMS identification. The on-line access is provided through an access code.

Once the programmer/analyst is on-line, the methods of navigation within the interactive multi-module program analysis system are 1) performed by keying in numbers that correspond to options, 2) by using programmable function keys (PFKEYS) as defined by screen instructions, 3) or by following the selection process as defined for the particular report displayed. Help information is available by the PF1 key.

There are no specific rules or paths to follow when using the interactive system. Each user makes use of the analysis capabilities most suited to the particular maintenance or enhancement function at hand.

The interactive program analysis system is designed to work with the programmer/analyst and allows the programmer/analyst to decide what information is needed to resolve a particular problem. The interactive system helps the analyst obtain desired information quickly and accurately. By providing such information to the programmer/analyst, the analyst can then decide what additional information is necessary. The interactive system provides easy navigation within itself so as to provide such additional information as needed based upon information previously presented to the analyst.

In addition, the interactive system, through its global module selection, allows the programmer/analyst to determine how many modules he or she wants included within the analysis "scope" of the current on-line session. The "scope" of the session can range from one specific module up to the entire number of modules that have had their information included within the eight databases. Allowing the programmer/analyst to custom tailor the number of modules in the "scope" of the current session, facilitates on-line searching since smaller amounts of information are analyzed from the databases. The programmer/analyst can also change the size of this "scope" as the session progresses, depending upon information obtained and as the analysis needs change.

The interactive program analysis system also allows the programmer/analyst to create, store, edit and copy lists of COBOL modules that would likely be reused so as to define the "scope" of the information accessed during different interactive analysis sessions. Thus for example, if the analyst discovers that the current session which is analyzing ten specific COBOL modules might be used in the future, then the maintenance change analysis can be re-performed by accessing a file identifying those same modules. By storing these lists of COBOL modules, the later analysis is facilitated by accessing those modules through the global module selection based upon the stored module information. The present invention performs this task by creating module lists for this purpose. By creating such lists, the time otherwise required for repeatedly determining what modules are involved with a maintenance change is eliminated.

Finally, all on-line reports can be printed using programmable function key 4. A programmer/analyst can choose to print the entire report or only the current screen.

Main Analysis Functions of the Interactive Program Analysis System

As mentioned above, there are four primary functions performed in the interactive program analysis system; namely, Global Module Selection, Dam Analysis, Process Analysis, and Impact Analysis.

Global Module Selection Section 52

This portion of the interactive multi-module program analysis system allows the programmer/analyst to customize the scope of the current session; that is, which modules are to be analyzed during the current session so as to fit analysis needs of a particular maintenance or enhancement activity. Thus, although a particular program application may contain several hundred modules, it may be that to perform a particular maintenance or enhancement, such as updating a minimum insured amount in a particular state for a particular type of insurance policy, only requires a relatively small number of modules need to be analyzed for input. If this module identity information is previously known or if it is determined at the time that the modification is to be made, only those modules need to be analyzed during the interactive program analysis system session. Thus, the global module selection includes the ability to use masking characters and ranges so as to select modules from the overall group of modules forming the application program. Module selection also includes the ability to create and re-use individual lists of modules as well as the ability to create, re-use and secure divisional module lists. Finally, module selection includes the ability to change the scope of a particular interactive program analysis session during the current session as the analysis needs of the programmer/analyst change.

Data Analysis Section 54

This section of the interactive multi-module program analysis system allows the programmer/analyst to perform detailed analysis of the data elements referenced within the procedure division source code of a specified module or within the data elements of any specified pair of modules linked by corresponding call and entry statements. Derailed analysis available with respect to data elements includes the items set forth in Table 6.

TABLE 6

1. The ability to determine all the modules that a call-parameter is passed to from a given module and what the matching entry-parameters are named.
2. Trace a data element obtained from a report or otherwise to its origin and see what has occurred in order to create the report data element. The derivation of data elements can be performed on a step-by-step basis using the Individual Data Element Analysis function of the interactive program analysis system and using the information displayed to guide the programmer/analyst to the next analysis choice.

3. Determine all the data elements that can change the value of a specific data element by using the How-Set sub-function of the Individual Data Element Analysis function.
4. Determine all the places that a specific data element changes the value of other data elements by using the How-Used sub-function of the Individual Data Element Analysis function.
5. Determine all the other modules that use a specific data element through linkage by using the Expand sub-function of the Call/Calling function or through Individual Data Element Analysis function.

Process Analysis Section 56

This section of the interactive multi-module program analysis system allows the programmer/analyst to perform higher level analysis about an entire group of modules previously selected using the global module selection function. It also provides for process analysis of a specific group of COBOL modules or a single COBOL module, depending upon the needs of the analyst.

Process analysis includes the analysis of the call and calling modules as well as their parameters, the user controlled analysis of the control flow between processes (paragraphs) within a specific module, and the analysis of the internal documentation of a user specified module.

In particular, the functions set forth in Table 7 can be performed by the process analysis sections:

TABLE 7

1. Determine the call/calling hierarchy of the modules within the current session or part of the session as determined by the global module selection section, with the ability to view module documentation for any module in the hierarchy.
2. Create a tree diagram of the call/calling modules, beginning with any user specified module or for all modules in the current session by using the Generate Scan HChart option frown the call/calling function of the interactive system. Scan HCHART is a product of Computer Data Systems Inc, Rockville, Md.
3. Determine the entire calling structure of a group of modules beginning with any user specified module.
4. Match the call and entry-parameters between any calling and called module and expand the subelements of any parameter. In addition, any subelement can be chosen to determine how it is referenced, used, set, calls or called.
5. Determine if there is a mismatch between the call-parameters in a calling module and the entry-parameters of a called module by using the call-parameter chaining feature of the Call/Calling function or by using the Inter-module Data Analysis function.
6. When a change is needed to one module, determine if other modules may be impacted by the change by using the Individual Data Element Analysis Function to determine if the data being changed is used in a call from another module or in a call to another module.
7. Trace a call-parameter in a user specified module to all other modules in that chain regardless of parameter name differences.
8. Trace the control flow within a module and navigate to called modules using the problem being solved as the guide.
9. Determine the operation of one or more modules by viewing their internal documentation.
10. Determine when or if a change was put into a previous version of a module by viewing the remarks section of that module through the Module Documentation function of the interactive system or by searching the "Remarks" section for specific keywords of data using the Keyword Search function.
11. determine what modules call specific utilities by using the Call/Calling function of the interactive system.

Impact Analysis Section 58

This section of the interactive multi-module program analysis system allows the programmer/analyst to determine all the modules and data elements that may be impacted by a maintenance change or enhancement. The impact analysis section provides the ability to search for applicable strings or words within a module, group of modules or all modules within the current session.

Impact analysis can provide, among other capabilities, the functions set forth in Table 8.

TABLE 8

1. Find for all modules or subset of modules in the current session, the location(s) of a particular keyword string or strings from keywords within a work request. Any keyword string found can then be immediately selected for further analysis. Thus for example, if a state code in the modules is to be found, it may have a different name in different modules; such as, STATE-CODE, ST-CODE, STATE-CDE, ST-DC, or S-CDE. The keyword string capability can be used to find all occurrences and their locations.
2. Search the source code database containing remarks, comments and procedural source code for keyword or keyword strings that can assist with the analysis of a particular problem.
3. When making a change to a copy library member (a prewritten source code entity which can be included in a module at compile time), the programmer/analyst immediately knows all the modules that are impacted by that change by using the Copy Member Analysis function of the interactive system.

Reports can be created with the interactive system by selecting option 9 throughout the system, including from the MAIN MENU which in turn executes the Tabletalk TM report facility, a feature of FOCUS. The Tabletalk TM facility allows the user to create specific reports using menu options without writing FOCUS program code. Printouts of all or part of the displayed reports can also be created throughout the system by selecting PRINT (PF4). Finally, as discussed earlier, a thorough group of Help screens are available throughout the process by selecting Key PF1 from within any menu. The help screens available are context sensitive. General help information about the system and about using Tabletalk TM reporting is available from the MAIN MENU by selecting PF1.

From the foregoing description, it is clear that the present invention provides a diverse set of tools enabling the programmer/analyst to analyze multiple modules with regard to data analysis, process analysis and impact analysis. The above example illustrating the interactive analysis functions provide the programmer/analyst with necessary information to implement a desired modification or enhancement to the overall program. By knowing the relationships for data elements, the process analysis concerning call and calling modules and related information, as well as the impact analysis concerning relationships amongst the modules, the modification or enhancement operation is greatly facilitated and the integrity of that modification or enhancement is increased over analysis which does not make use of the present invention.

Although the present invention has been described and implemented with regard to the analysis of modules written in the COBOL high-level language, it is readily apparent that the concepts embodied within the system and disclosed methodology would be applicable to other high level languages which are procedural in nature and therefore capable of being analyzed on an inter-module basis.

It is thus seen that the object set forth again, and those made apparent from the preceding description, are efficiently attained and, since certain changes may be made in the system and in carrying out the above method without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention described, and all statements of the scope of the invention which, as a matter of language, might be said to fall therebetween.

Having described the invention, what is claimed is:

1. A system for creating databases for use in an interactive multi-module program maintenance system including a set of pre-existing program modules for providing a source for program module information signals contained within the databases, at least a subset of said pre-existing program modules referencing one another with call and entry statements having parameters with sub-elements for passing between a given calling module and a given called module, said system comprising:

A) means for reading information from said pre-existing program modules and providing the program module information signals;

B) data processing means, responsive to said program module information signals, for providing extracted inter-module information signals, including means for extracting and matching the call and entry statement from said program module information signals, and means for expanding parameters to extract information about said sub-elements from said program module information signals; and C) means for creating at least one database, responsive to said extracted inter-module information signals, for storing said extracted inter-module information signals containing parameter information about said parameters passed between the given called module and the given calling module sub-element information about the sub-elements of said parameters.

2. A system for creating databases for use in a multi-module program maintenance system as defined in claim 1, further wherein the pre-existing modules have names, wherein a module is called by another module by the called module's name, wherein a calling module may call more than one module, and wherein the call-parameters have an order, and wherein said data processing means includes means for extracting the module name, the called module name, the order of the call in the calling module, the call-parameters used in the call, and the order of the parameters.

3. A system for creating databases for use in a multi-module program maintenance system as defined in claim 2, wherein said data processing means for extracting the entry-parameter order numbers obtains said information from the position of each parameter in its associated parameter list.

4. A system for creating databases for use in a multi-module program maintenance system as defined in claim 1, wherein the call and entry-parameters have names, wherein a data element may be a parameter or a sub-element of a parameter, wherein each sub-element of a parameter is associated to the parameter by a level number, wherein the sub-elements have an associated type, beginning location and ending location; wherein the data processing means extracts information with respect to where the parameter is found and the name of the call or entry-parameter, and for each parameter and each sub-element of a parameter, information is extracted from the modules so as to determine the actual size and description of each element and sub-element, including the level number of each element, an indicator of whether the element is a parameter or a sub-element of a parameter, a beginning element location and an ending element location in relationship to the length of the entire parameter, the type of data element indicator, a field to indicate if the data element uses "SYNC" and a field to indicate if the data element contains the "OCCURS" clause; and wherein the means for creating at least one database comprises means for creating a parameter-expansion database that contains said extracted information about the parameters and sub-elements of the parameters.

5. A system for creating databases for use in a multi-module program maintenance system as defined in claim 4, wherein the extracting means further extracts information concerning the size of numeric data elements to the left and to the right of the decimal and extracts the sign indicator of each element, and wherein the means for creating a parameter-expansion database creates a database field to store the size of the numeric data elements and a field to store the data element sign indicator.

6. A system for creating databases for use in a multi-module program maintenance system as defined in claim 5, wherein a data element may redefine another data element, further wherein the data processing means extracts information which determines if a data element redefines another data element, and wherein the means for creating the parameter-expansion database stores the extracted redefined data element information.

7. A system for creating databases for use in a multi-module program maintenance system as defined in claim 1, wherein each pre-existing module may contain a remarks section and comments, wherein the data processing means extracts information concerning the remarks section and comments and wherein the means for creating at least one database stores said information in a source code database.

8. A system for creating databases for use in a multi-module program maintenance system as defined in claim 1, further wherein the pre-existing modules may use copy library members and wherein the pre-existing modules have names, wherein the data processing means includes means for extracting information about the copy library members used by each of the pre-existing modules, including each module name and the identity of each copy library member used by said module, and wherein the means for creating at least one database creates a copy-member database containing said extracted information.

9. A system for creating databases for use in a multi-module program maintenance system in which the source for the information contained within the databases is obtained from a set of pre-existing program modules of which at least a sub-set of said pre-existing modules contain references to one another, and further wherein the pre-existing modules may contain data elements, wherein the data elements have names, wherein the pre-existing modules include procedure-division source code, wherein a data element can be referenced within said source code at a particular line number of the source code, said set of pre-existing modules to be subsequently analyzed, comprising:
   A) means for reading information from said pre-existing modules;
   B) data processing means for extracting information, including inter-module information, from said read information, including for each data element in each pre-existing module, information concerning how each data element is referenced within the procedure-division source code of the module, as well as extracting information including the data element name, the pre-existing module name, and the line number where the reference is located; and
   C) means for creating at least one database containing at least said extracted inter-module information including an update indicator that is set to a pre-determined value if a reference changes the value of a data element.

10. A system for creating databases for use in a multi-module program maintenance system in which the source of the information contained within the databases is obtained from a set of pre-existing program modules of which at least a sub-set of said pre-existing modules contain references to one another, wherein the pre-existing modules may contain data elements, wherein the data elements have names, wherein a data element may change another data element, wherein the pre-existing modules contain procedure-division source code, and wherein a data element that changes another data element can be referenced within said procedure-division source code at a particular line number, said set of pre-existing modules to be subsequently analyzed, comprising:
   A) means for reading information from said pre-existing module;
   B) data processing means for extracting information, including inter-module information, from said read information, including means for extracting information about all the data elements that are used within the procedure-division source code of each module so as to change the value of other data elements in the module, including the data element name, the pre-existing module name, the line number where the data element is used to change another data element, and the name of the data element being changed; and
   C) means for creating at least one database containing at least said extracted inter-module information including the creation of a how-used database containing the extracted information about all the data elements that are used within the procedure-division source code of each pre-existing module so as to change the value of other data elements in each such pre-existing module.

11. A system for creating databases for use in an inter-active multi-module program maintenance system, in which the source of the information contained within the databases is obtained from a set of pre-existing program modules of which at least a sub-set of said pre-existing modules contain references to one another, further wherein the pre-existing modules may contain data elements, wherein the data elements have names, where the modules have names, wherein a data element may have its values set or changed by a constant, literal, or another data element and wherein the modules contain procedure-division source code, and wherein a data element that has its value set or changed is so set or changed that a particular line number of the procedure-division source code, said set of pre-existing modules to be subsequently analyzed, comprising:
   A) means for reading information from said pre-existing modules;
   B) data processing means for extracting information, including inter-module information from said read information, including means for extracting information about all the data elements that have their values set or changed within the procedure-division source code of the pre-existing modules, including the data element name, the pre-existing module name, the line number where the data element is set or changed and the name of the constant, literal or other data element that changes the data elements value; and
   C) means for creating at least one database containing at least said extracted inter-module information, including creating a how-set database containing the extracted information about all the data elements that have their values set or changed within the procedure-source code of the pre-existing modules.

* * * * *